United States Patent [19]
Barton et al.

[11] 3,823,328
[45] July 9, 1974

[54] LIQUID LEVEL CONTROL SYSTEM AND SWITCH ASSEMBLY THEREFOR

[75] Inventors: William Forbes Barton, Arlington Heights, Ill.; William E. Reese, Mansfield, Ohio

[73] Assignees: Grigsby Barton, Inc., Rolling Meadows, Ill.; Peabody Barnes, Inc., Mansfield, Ohio

[22] Filed: Nov. 17, 1972

[21] Appl. No.: 307,647

[52] U.S. Cl. ............... 307/118, 200/67 F, 335/205, 73/308
[51] Int. Cl. ............................................. H01h 5/02
[58] Field of Search .................. 200/67 F; 335/205; 307/118; 73/305, 308, 313

[56] References Cited
UNITED STATES PATENTS
3,389,603    6/1968   Jacobs .............................. 335/205
3,611,219   10/1971   Iwami .............................. 335/205

*Primary Examiner*—Herman Hohauser
*Attorney, Agent, or Firm*—Fitch, Even, Tabin & Luedeka

[57] ABSTRACT

A liquid level control system which includes a reed switch actuating assembly having a magnet movable in response to a change in liquid level to effect opening and closing of reed switch contact elements. Pole pieces are positioned at opposite ends of the travel stroke of the magnet and effect snap-action movement of the magnet as it approaches either of the pole pieces, the pole pieces serving to establish magnetic latching of the magnet until a predetermined force is applied thereto to separate the magnet from the associated pole piece. The magnet is connected to a float or the like for movement in response to a change in liquid level within a tank to effect energizing of pump means.

11 Claims, 3 Drawing Figures

PATENTED JUL 9 1974 3,823,328

LIQUID LEVEL CONTROL SYSTEM AND SWITCH ASSEMBLY THEREFOR

The present invention relates generally to liquid level control systems, and more particularly to a liquid level control system having a novel reed switch actuating assembly wherein a magnet is movable to effect opening and closing of reed switch contact elements and undergoes snap-action as it approaches pole pieces disposed at either end of its travel stroke.

It is known to employ magnetic means movable in response to a change in liquid level in a tank or reservoir to effect closing of reed contact elements of reed switches. Conventionally, a permanent magnet is moved in direct response to a change in liquid level and is coaxially disposed with respect to one or more reed switches such that when the magnet rises or drops to a position adjacent a reed switch in response to a change in liquid level, the reed switch contacts close to energize a control circuit which may either pump liquid from the tank or allow more liquid into the tank. The known switch assemblies employing magnet means to effect closing of reed switches exhibit the disadvantage that during gradual movement of the magnet in response to a change in liquid level, the reed switch contact elements slowly come under the influence of the magnetic field of the magnet so that one or both of the contact elements slowly moves toward the other until actual contact is made. As a result of such gradual closing of the reed switch contact elements, arcing often occurs across the contacts to effect premature closing of the control circuit in which the reed switch is connected. Moreover, the known reed switch actuating assemblies have not been acceptable for use in fluid reservoir or tank systems wherein it is desired to effect a change in the switch condition only after the liquid level has changed an appreciable extent. The present invention overcomes the disadvantages in the known liquid level control systems by providing an improved reed switch actuating assembly wherein a movable magnet undergoes a snap-action movement as it approaches either end of an operating stroke to effect a relatively fast-action closing or opening of the reed switch contact elements. The present invention further establishes a magnetically latched condition for the magnet when it reaches either end of its travel stroke and maintains the magnet in this position until a predetermined force is applied thereto to effect movement of the magnet toward the opposite end of its travel stroke.

Accordingly, one of the primary objects of the present invention is to provide a liquid level control system having novel reed switch actuating means which includes magnet means movable in a manner to effect fast-action transitional movement of switch contacts between "open" and "closed" conditions.

Another object of the present invention is to provide a novel reed switch actuating assembly wherein the magnet means is latched in its extreme travel positions until a predetermined force is applied thereto whereby to prevent gradual opening or closing of the reed switch contact elements and eliminate undesirable arcing therebetween.

Another object of the present invention is to provide a novel reed switch assembly as described wherein metallic pole pieces are disposed at either end of the travel stroke of the magnet to effect snap-action movement of the magnet as it approaches either pole piece, the pole pieces further serving to effect latching of the magnet therewith until a predetermined force is applied to separate the magnet from the associated pole piece.

Another object of the present invention is to provide a reed switch actuating assembly as described which employs a printed circuit board upon which the reed switch is positioned in predetermined relation so as to allow economical and exacting assembly of the reed switch relative to the movable magnet means.

Further objects and advantages of the present invention, together with the organization and manner of operation thereof, will become apparent from the following detailed description of the invention when taken in conjunction with the accompanying drawing wherein like reference numerals designate like elements throughout the several views and wherein.

Figure 1:
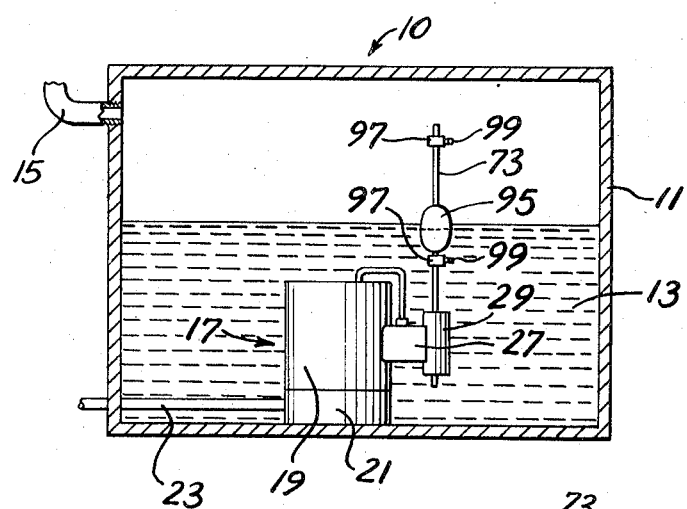
FIG. 1 is a partial vertical sectional view taken through a liquid tank having therein a switch actuating assembly in accordance with the present invention to control a pump in response to the liquid level within the tank.

Referring now to the drawings, and in particular to FIG. 1, a liquid level control system in accordance with the present invention is indicated generally at 10. The liquid level control system 10 includes, by way of illustration, a tank 11 which is adapted to hold a liquid 13, the level of which may vary. In the illustrated embodiment, the tank 11 may comprise a sump tank and the liquid 13 may be water received through a runoff flow pipe 15 as is known. The tank 11 supports pump means, indicated generally at 17, therein which may comprise an electric motor 19 having a liquid pump 21 coupled thereto. The pump 21 may comprise either a centrifugal or positive displacement pump having an inlet (not shown) in communication with the liquid 13 within the tank and an outlet conduit 23 through which the liquid 13 may be pumped to withdraw liquid from the tank and maintain the level of the liquid within a predetermined depth range. The present invention is particularly directed to switch actuating assembly means, indicated generally at 25, operatively associated with the pump motor 19 to selectively energize the motor in response to the level of liquid 13 within the tank 11. While the switch actuating assembly means 25 is illustrated in conjunction with the pump means 17 within the tank 11, it will be understood that the switch actuating assembly means 25 may find application in conjunction with other types of control systems wherein it is desired to control an operating switch in response to the level of a fluid medium contained within a tank or reservoir.

The switch actuating assembly 25 includes housing means having a first portion 27 which serves to support switch means, and a second portion 29 which serves to support switch actuating means, as will be described more fully below. The first and second portions, 27 and 29, respectively, of the housing means may be formed integral with each other and are preferably formed from a high strength plastic material which lends itself to molding techniques. Noting FIG. 3, the portion 27 of the housing means is defined by generally rigid parallel planar sidewalls 31, a concave rear wall 33, and a forward wall portion 35 integrally connected to or having the second portion 29 of the housing means formed intermediate thereof as shown. The upper edges of the end walls 31, the rear wall 33, and the forward wall 35 are integrally connected to an upper wall 37 as shown in FIG. 2 to define a cavity or chamber within the upstanding walls.

The rearward wall 33 of the housing portion 27 preferably has a concave curvature similar to the peripheral curvature of the pump motor 19 so as to seat against the outer surface of the motor when mounted thereon. To this end, the rear wall 33 has a T-shaped slot 39 provided generally intermediate the length thereof, which slot 39 extends the full vertical height of the rear wall 33 and receives a correspondingly T-shaped support 41 formed integral with or otherwise secured to the pump motor 19 for supporting the switch actuating assembly 25.

The second portion 29 of the housing means is generally cylindrical and defines a cylindrical bore or chamber 43 therethrough, the axis of the bore 43 being generally perpendicular to the plane of the upper wall 37 of the first housing portion 27. The first housing portion 27 has a pair of opposed vertically extending grooves 47 formed in the opposed end walls 31. The grooves 47 cooperate to receive the vertical edge portions of a flat relatively thin printed circuit board 49 with the upper horizontal edge of the printed circuit board abutting the upper wall 37 of the housing means. In accordance with known practice, the printed circuit board 49 is formed with openings adapted to receive connectors in the form of posts projecting from the housings of electrical components or parts to be included in circuits on the printed circuit board. To this end, the printed circuit board 49 is adapted to support switch means, indicated generally at 51, comprising a conventional reed switch having two magnetizable conducting reed elements 53 and 55 enclosed in a hermetically sealed hollow tubular casing 57 of insulating material such as glass. The reed contact elements 53 and 55 project inwardly toward each other from opposite ends of the tubular casing 57 in cantilever fashion, with the adjacent ends of the reed contact elements being in overlapping normally spaced relation. The reed contact elements 53 and 55 have outer end portions 59 which are securely received within suitable openings in the printed circuit board 49, thereby allowing assembly of the switch means 51 onto the printed circuit board by known manufacturing techniques prior to assembly of the printed circuit board 49 into the grooves 47 in the first portion 27 of the switch actuating assembly 25. The printed circuit board 49 may support other electrical components, as desired, which may be connected in circuit with the switch means 51 to provide the desired circuit characteristics for control of the pump motor 19. The opposite end portions 59 of the switch contact elements 53 and 55 are connected through suitable connectors 61 and 63 to conductors which pass through a sealed opening in a boss 65 formed on the upper wall 37 of the switch actuating assembly 25.

Figure 2:
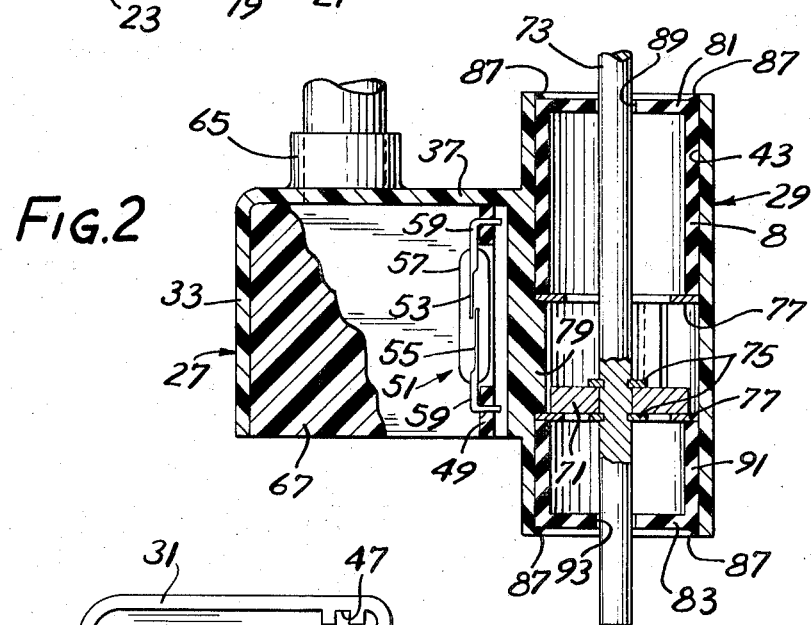
FIG. 2 is a median sectional view taken generally along the line 2—2 of FIG. 3, and illustrates the magnet means relative to the reed switch, the magnet being shown in a position to establish an open condition of the reed switch contact elements.
Figure 3:
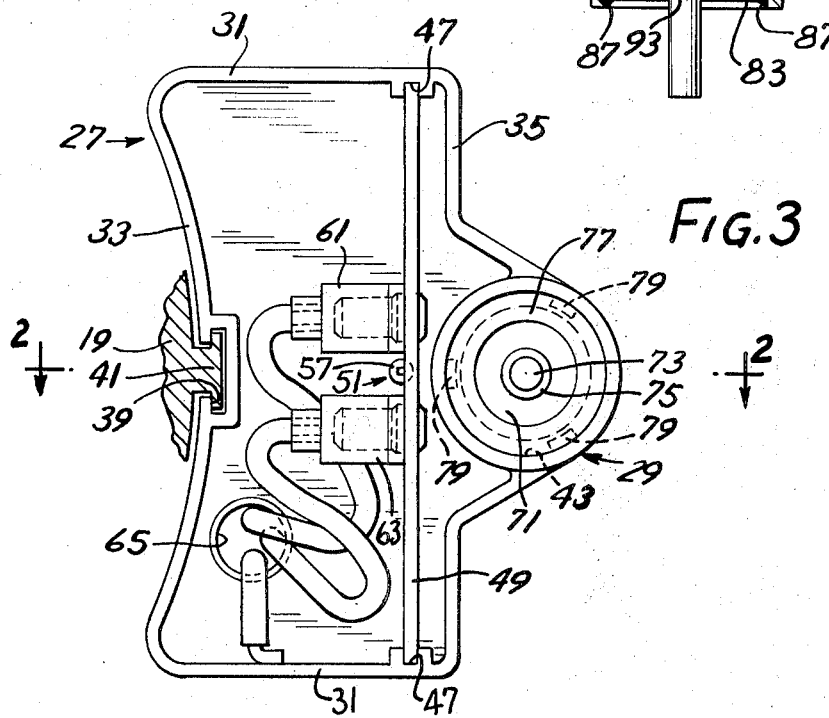
FIG. 3 is a bottom view of the switch actuating assembly of FIG. 2, with the lower end cap and encapsulating material removed to better illustrate the elements within the housing.

After the printed circuit board 49, with the switch means 51 and other associated electrical components pre-assembled thereon, is assembled in the housing portion 27 of the switch actuating assembly 25, an encapsulating material or potting compound, such as a suitable epoxy resin, shown at 67 in FIG. 2, is inserted into the chamber or compartment defined by the upstanding walls of the housing portion 27 in liquid form in a known manner and allowed to harden and seal the reed switch means and associated circuit elements on the printed circuit board 49 within the housing portion 27. The encapsulating material or potting compound 67 is inserted into the housing portion 27 in sufficient quantity such that, upon hardening, the encapsulating material will form a generally planar surface coplanar with the lower edge surfaces of the walls 31, 33 and 35 of the housing portion 27.

The housing portion 29 of the switch actuating assembly 25 serves to receive and support magnet means comprising an annular ceramic magnet 71 which is secured on a nonconducting rod 73 by snap rings 75. The opposite parallel planar surfaces of the magnet 71 are of opposite magnetic polarity so as to establish a magnetic field therebetween, the magnetic lines of flux being disposed in circular paths lying in planes normal to the annular centerline of the annular magnet as is known. The ceramic magnet 71 and the associated support rod 73 are movable along the longitudinal axis of the bore 43 between a pair of spaced annular magnetic pole pieces 77. The pole pieces 77 are made of a flat magnetic material, such as stainless steel, which is characterized as having negligible hysteresis and substantially no residual magnetism. The pole pieces 77 abut against the opposite ends of three circumferentially spaced projections 79 which are preferably formed integral with and project radially inwardly from the bore 43 in the housing portion 29. The projections 79 are of limited longitudinal length, as shown in FIG. 2, and have their end surfaces disposed in predetermined relation to the reed switch elements 53 and 55, as will become apparent hereinbelow.

The pole pieces 77 are retained against the opposite ends of the porjections 79 by upper and lower end caps 81 and 83, respectively, made of suitable nonmagnetic material such as plastic. The upper end cap 81 has an annular wall portion 85 which is snugly received within the bore 43 of the housing portion 29, the lower annular end surface of the wall 85 abutting the upper pole piece 77 and retaining it against the upper end surfaces of the projections 77. The longitudinal length of the end cap 81 is such that its upper end surface is approximately 1/32 inch below the annular upper end surface of the housing portion 29. The upper end surface of the housing portion 29 is crimped or staked over, as shown at 87, preferably at approximately six points circumferentially about the upper end cap 81 to retain the upper end cap against the associated upper pole piece 77. The upper end cap 81 has a central opening 89 therein which receives the rod 73 therethrough in free sliding relation.

The lower end cap 83 is generally similar to the upper end cap 81 and has an annular wall portion 91 which is snugly received within the lower end of the bore 43, the upper annular end surface of the wall portion 91 abutting the lower pole piece 77 to retain it against the lower end surfaces of the projections 77. The longitudinal length of the lower end cap 83 is sufficient to allow the housing portion 29 to be staked over at 87 about the lower end cap to retain it against the lower pole piece 73 in similar fashion to securing the upper end cap 81. The lower end cap 83 has a central opening 93 therein which receives the lower end of the rod 73 therethrough in free sliding relation. The upper and lower end caps 81 and 83, respectively, serve to guide the rod 73 and magnet 71 during longitudinal movement within the bore 43. In one embodiment, a clearance of approximately 0.040–0.050 inch was provided between the outer diameter of the annular magnet 71 and the inner surfaces of the projections 79. It will be understood that the projections 79 need not extend fully between the associated pole pieces 77, but may comprise radial abutments spaced sufficiently to provide the desired spacing of the pole pieces.

The pole pieces 77, and thus the limits of the travel stroke of the magnet 71, are positioned such that when the magnet is in a first or "off" position as shown in FIG. 2, the magnetic field will be ineffective to subject each of the reed switch contact elements 53 and 55 to a different polarity, and the contact elements thus remain in their normally open positions. When the magnet 71 is moved to a second or "on" position abutting the upper pole piece 77, the median plane of symmetry between the magnetic pole faces of the magnet 71 generally intersects the mid point of the overlapping ends of the reed contact elements 53 and 55 such that each of the contact elements is influenced by a different polarity of the magnet. With one of the reed contact elements 53, 55 being influenced by one polarity of the magnetic field, and the other contact element being influenced by the other pole, the contact elements are magnetically attracted to each other and close to complete a circuit through the switch means 51.

By providing a magnetic pole piece 77 at each end of the travel stroke of the magnet 71, the magnet will undergo a snap-action movement as it approaches either of the pole pieces due to the attraction of the pole piece by the magnetic field of the magnet 71. The magnetic field of the magnet 71 is preferably made strong enough so that a pole piece is attracted by the magnetic field when the magnet is moving toward one of the pole pieces and is disposed a distance from the pole piece equal to slightly less than one-half the distance between the spaced pole pieces. When the magnet 71 engages either of the pole pieces 77, the magnet will stay magnetically latched to the associated pole piece until a force is applied to the magnet, through the rod 73, sufficient to separate the magnet from the associated pole piece, as will become more apparent hereinbelow.

As noted, the switch actuating assembly 25 is illustrated, by way of example, as being employed in a tank 11 to selectively energize a motor-pump assembly 17 in response to the level of liquid 13 within the tank 11. More particularly, the switch actuating assembly 25 is employed to energize the motor-pump assemply 17 when the liquid 13 rises to a predetermined level to thereby withdraw liquid from the tank 11. When the level of the liquid 13 in the tank is lowered to a predetermined lower level, the motor-pump assembly 17 is de-energized. To this end, the rod 73 has a float 95 adjustably secured thereon, the float 95 having axially aligned openings therethrough to receive the rod 73. The float 95 is of known design and is adapted to be continually approximately half submerged in the liquid 13. A pair of stop members 97 are secured on the rod 73 above and below the float 95 and are adjustable along the longitudinal length of the rod by means of set screws 99 to vary the free travel of the float on the rod 73 without effecting movement of the rod. In one embodiment of the float arrangement illustrated in FIG. 1, the adjustable stop members 97 were positioned to allow approximately six inches of free travel of the float 95 on the rod 73 between the stop members.

As noted, a feature of the liquid level control system 10 in accordance with the present invention, and particularly the switch actuating assembly means 25 therefor, is that the switch actuating assembly means 25 is adapted to produce a snap-action movement of the magnet 71 in response to a predetermined change in liquid level within the tank 11 in a manner to effect a fast-action transitional movement of the reed switch contact elements 53 and 55 between their "open" and "closed" conditions. The snap-action movement of the magnet 71 is influenced by the buoyancy force of the liquid 13 acting on the float 95, the weight of the float 95 which operates half filled with liquid, and the magnetic attraction of the magnet to the respective spaced pole pieces 77. Assuming the magnet 71 to be in a lower or "off" position, as illustrated in FIG. 2, the magnetic field of the magnet 71 will be ineffective to influence both of the reed contact elements 53 and 55 in a manner to effect closing thereof. With the reed switch means 51 in an open condition, the pump means 17 will be de-energized so that liquid entering into the tank 11 will cause the float 95 to raise upwardly on the support rod 73. As the liquid 13 within the tank 11 rises and thereby raises the float 95 to a position wherein the float engages the upper stop 97 on the rod 73, a buoyance force acts upwardly on the float 95 to bias the control rod 73 upwardly.

In one embodiment of a switch actuating assembly 25, the pole pieces 77 are spaced to provide a ⅜ inch travel stroke for the magnet 71 between its "on" and "off" positions. The strength of the magnetic field of the magnet 71 acting on the lower pole piece 77 is sufficient to maintain the magnet magnetically latched to the lower pole piece after the float engages the upper stop 95 and until the liquid level 13 rises approximately ½ inch over the longitudinal center of the float 95. When the liquid level has risen ½ inch above the longitudinal center of the float, an upward buoyancy force is created on the float sufficient to effect release of the magnet 71 from the lower pole piece 77. Because the magnet 71 can only travel upwardly ⅜ inch, and because the buoyancy force acting on the float 95 is attempting to move the float upwardly approximately ½ inch to effect floating equilibrium of the float, a snap-action movement of the magnet 71 upwardly from the lower pole piece 77 results. As the magnet 71 rises upwardly toward the upper pole piece 77 and reaches a position wherein the upper pole piece is within the magnetic field of the magnet 71, a stronger snap-action movement of the magnet is effected due both to the magnetic attraction of the upper pole piece 77 and the buoyancy force continuing to act upwardly on the float 95 to effect floating equilibrium thereof.

When the magnet 71 is in its upper position abutting the upper pole piece 77, the switch contact elements 53 and 55 are each influenced by a different magnetic polarity to cause the reed contact elements to attract each other and close. Through the provision of the snap-action movement of the magnet 71 from its lower to its upper position, the reed switch contact elements 53 and 54 are precluded from being gradually subjected to the influence of the magnetic field of the magnet which could result in gradual relative closing movement of the contact elements and premature arcing-over between the contact elements. The snap-action movement of the magnet 71 thus establishes a fast-action transition of the switch contact elements 53 and 55 between their "off" and their "on" conditions. After the magnet 71 has engaged the upper pole piece 77, the magnet is magnetically latched to the upper pole piece until a sufficient downward force is applied to the magnet to effect release thereof from the upper pole piece. Closing the reed contact elements 53 and 55 serves to energize the pump 17 in the tank 11 and effect withdrawal of liquid 13 from the tank.

As the liquid 13 is withdrawn from the tank by the pump means 17, the liquid level falls with a corresponding downward movement of the float 95 on the support rod 73. The magnetic latching of the magnet 71 to the upper pole piece 77 precludes movement of the magnet 71 during initial downward movement of the float 95. As the liquid level falls, the float 95 moves downwardly on the rod 73 until the float engages the lower stop 97. Thereafter, float 95 is momentarily maintained in a fixed position until the liquid level has dropped sufficiently below the longitudinal center of the float such that the weight of the half-filled float is greater than the upward buoyancy force acting on the float whereupon the resultant downward force effects release of the magnet 71 from the upper pole piece 77. As the magnet 71 moves downwardly to a position wherein the lower pole piece 77 enters the magnetic field of the magnet 71, the magnet will effect a snap-action movement toward the lower pole piece 77. When the magnet 71 engages the lower pole piece 77, the reed switch 51 is opened and the pump means 17 is de-energized, thus allowing the liquid level 13 within the tank 11 to rise. This cycling of the pump means 17 is operative to control the level of liquid within the tank 11 between predetermined upper and lower limits.

While a preferred embodiment of the present invention has been illustrated and described, it will be understood to those skilled in the art that changes and modifications may be made therein without departing from the invention in its broader aspects. For example, while the described switch actuating assembly 25 has been illustrated in conjunction with liquid tank 11, it will be understood that the switch actuating assembly finds ready application in other environments wherein it is desired to employ switch means operable through a movable magnet with the magnet undergoing snap-action as it approaches either end of a travel stroke, and is magnetically latched in its extreme travel positions until a predetermined force is applied to the magnet to effect release thereof and move the magnet to the opposite end of its travel stroke.

What is claimed is:

1. A switch actuating assembly including, in combination, housing means, switch means supported by said housing means and including at least one pair of magnetizable conducting reeds projecting toward each other in cantilever fashion with overlapping normally spaced adjacent ends, magnet means having spaced magnetic pole faces establishing a magnetic field therebetween, said magnet means being movable between a first position wherein at least one of said reeds is outside the influence of said magnetic field and a second position wherein said reeds are each influenced by a separate pole of said magnet means so that said reeds are attracted to each other to close at their said adjacent ends, and means disposed at said first and second positions of travel of said magnet means for effecting snap-action movement of said magnet means as said magnet means approaches its said first and second positions, said means for effecting snap-action movement of said magnet means comprising a metallic pole piece disposed at each of the opposite ends of travel of said magnet means, said pole pieces further serving to effect latching of said magnet means therewith until a predetermined force is applied to said magnet means to effect release of said magnet means from the associated pole piece.

2. A switch actuating assembly as defined in claim 1 wherein said metallic pole pieces are made of stainless steel and have negligible residual magnetism after release from said magnet means.

3. A switch actuating assembly including, in combination, housing means, switch means supported by said housing means and including at least one pair of magnetizable conducting reeds projecting toward each other in cantilever fashion with overlapping normally spaced adjacent ends, magnet means having spaced magnetic pole faces establishing a magnetic field therebetween, said magnet means being movable between a first position wherein at least one of said reeds is outside the influence of said magnetic field and a second position wherein said reeds are each influenced by a separate pole of said magnet means so that said reeds are attracted to each other to close at their said adjacent ends, and means disposed at said first and second positions of travel of said magnet means for effecting snap-action movement of said magnet means as said magnet means approaches its said first and second positions, and a printed circuit board supported by said housing means, said reed switch means being secured to said board in predetermined relation thereon so that assembly of said printed circuit board and said housing means establishes said reed switch means in predetermined relation to said magnet means.

4. A switch actuating assembly as defined in claim 3 including an encapsulating material disposed within said housing means to seal said reed switch means and said printed circuit board for immersion in a liquid.

5. A switch actuating assembly as defined in claim 4 wherein said magnet means is adapted to be moved by a force acting externally of said housing means.

6. In a liquid tank or the like adapted to hold a liquid the level of which may increase by the introduction of liquid into the tank, the tank having pump means associated therewith to effect selective withdrawal of liquid from the tank; the combination therewith of switch means adapted to selectively energize the pump means, switch actuating means adapted to establish a first switch condition for said switch means to energize the pump means when the liquid level within the tank reaches a predetermined upper level and maintain said first switch condition until the level of the liquid falls to a predetermined lower level whereupon a second switch condition is established to de-energize the pump means, said switch means including a pair of elongated magnetizable contact elements projecting toward each other in cantilever fashion and having overlapping adjacent ends normally spaced to establish said first switch condition, and said switch actuating means including magnet means supported by said housing means for movement between a first position wherein the magnet is ineffective to close said switch contacts and a second position wherein the magnet is effective to close said switch contacts, said switch actuating means further including float means interconnected to said magnet means and movable in response to a change in liquid level within the tank to selectively move said magnet means, and means supported by said housing for cooperation with said magnet means to effect snap-action movement of said magnet means toward its said first and second positions after being moved to the general proximity of its said first or second positions by said float means in response to changes in liquid level within the tank.

7. The combination of claim 6 wherein said means to effect snap-action movement of said magnet means comprise metallic pole pieces which are disposed at opposite ends of the travel stroke of said magnet means and effect latching of said magnet means in its said first and second positions after movement thereto by said float means until a predetermined force is applied to said magnet means in a direction to release said magnet means from the associated pole piece.

8. The combination as defined in claim 6 wherein said switch actuating means includes a control rod secured to said magnet means, said float means being slidably supported on said rod for movement longitudinally therealong, and stop means adjustable along the length of said rod to limit the extent of sliding movement of said float whereby said float is slidable along said rod a predetermined distance without effecting movement of said rod in response to a change in liquid level in the tank.

9. The combination as defined in claim 6 wherein said switch actuating means includes a control rod secured to said magnet means, said housing means having bearing cap means thereon providing lateral support for said rod along the length thereof spaced from said magnet means.

10. The combination as defined in claim 6 wherein said housing means includes an encapsulating material which serves to hermetically seal said switch means.

11. The combination as defined in claim 6 wherein said magnet means comprises an annular magnet supported by said housing means for movement in a direction along the axis of said annular magnet, said pole pieces having annular configurations and being disposed in axial alignment with said annular magnet.

* * * * *